(12) United States Patent
King et al.

(10) Patent No.: US 9,327,652 B2
(45) Date of Patent: May 3, 2016

(54) VEHICLE TOOLHOLDER

(75) Inventors: Bryan Lewis King, Auburn, IN (US);
Rick Lynn Miller, Hicksville, OH (US)

(73) Assignee: ASW, LLC, Fort Wayne, IN (US)

( * ) Notice: Subject to any disclaimer, the term of this patent is extended or adjusted under 35 U.S.C. 154(b) by 282 days.

(21) Appl. No.: 13/175,167

(22) Filed: Jul. 1, 2011

(65) Prior Publication Data

US 2012/0000955 A1 Jan. 5, 2012

Related U.S. Application Data (60) Provisional application No. 61/360,754, filed on Jul. 1, 2010.

(51) Int. Cl.
*B60R 9/02* (2006.01)
*B60R 11/06* (2006.01)

(52) U.S. Cl.
CPC .. *B60R 9/02* (2013.01); *B60R 11/06* (2013.01)

(58) Field of Classification Search
CPC ............ B60R 11/06; B60R 7/14; B60R 9/02; Y10S 224/913; A47B 81/005
USPC ........................ 224/545, 565, 557, 401, 553
See application file for complete search history.

(56) References Cited

U.S. PATENT DOCUMENTS

| | | | |
|---|---|---|---|
| 2,919,058 A * | 12/1959 | Thompson | 224/546 |
| 3,432,133 A * | 3/1969 | Schmid | 248/201 |
| 3,854,641 A | 12/1974 | Kohls | |
| 4,579,263 A * | 4/1986 | Ehmke et al. | 224/539 |
| 6,382,488 B1 * | 5/2002 | Hancock | 224/547 |
| 6,902,089 B2 * | 6/2005 | Carnevali | 224/553 |
| D515,897 S * | 2/2006 | Greene | D8/71 |
| 7,100,808 B2 * | 9/2006 | Hancock et al. | 224/547 |
| 7,337,934 B2 * | 3/2008 | Alling et al. | 224/401 |
| D652,348 S * | 1/2012 | King et al. | D12/14 |
| 2004/0035732 A1 * | 2/2004 | Udy | 206/349 |
| 2005/0230444 A1 * | 10/2005 | Alling et al. | 224/401 |
| 2007/0089929 A1 * | 4/2007 | Schriewer | 182/127 |
| 2007/0262108 A1 * | 11/2007 | Columbia | 224/519 |
| 2010/0044999 A1 * | 2/2010 | Columbia | 280/511 |
| 2011/0114687 A1 * | 5/2011 | Wellborn | 224/401 |
| 2014/0097222 A1 * | 4/2014 | Robinson | B60R 7/14 224/401 |

* cited by examiner

*Primary Examiner* — J. Gregory Pickett
*Assistant Examiner* — Todd Anderson
(74) *Attorney, Agent, or Firm* — Basrnes & Thornburg LLP (57) ABSTRACT

The present disclosure provides a vehicle configured to hold a tool. The toolholder assembly includes a ring and a collar. The ring and collar are both attached to the vehicle adjacent a passenger compartment portion of the vehicle and the ring and collar are spaced apart from each other on the vehicle.

8 Claims, 10 Drawing Sheets

*FIG. 10*

VEHICLE TOOLHOLDER

RELATED APPLICATIONS

The present application is related to and claims priority to U.S. Provisional Patent Application, Ser. No. 61/360,754 filed on Jul. 1, 2010, entitled "Vehicle Tool Holder." The subject matter disclosed in that provisional application is hereby expressly incorporated into the present application.

TECHNICAL FIELD

The following disclosure relates to a runabout utility vehicle; and in particular, a toolholder for the runabout utility vehicle.

BACKGROUND AND SUMMARY

A runabout is a small, powered utility vehicle used to assist in accomplishing a variety of outdoor tasks. These vehicles are particularly useful for landscaping and gardening projects. Typically these projects require the use of long-handled tools, such as shovels, rakes, etc. Such utility vehicles, however, typically cannot carry these tools because their storage compartments are just not large enough to accommodate the long handles. And even if they could, having part of a handle stick out of the back or side of a vehicle may create a hazard or the tool may fall out of the vehicle altogether.

This present disclosure describes a toolholder on a runabout vehicle configured especially for long-handled tools. In one illustrative embodiment, the vehicle toolholder includes multiple points of securement to hold the long-handled tool. In an illustrative embodiment, a torsion ring, collar, and support are spaced apart on the vehicle working in conjunction with each other to hold the long-handled tool. The torsion ring can receive the handle of the tool. The torsion ring is also rotatable against a spring bias so the tool handle is held about vertical with respect to the vehicle. It is appreciated in other embodiments that the tool handle may be positioned in a non-vertical orientation. The collar may be aligned with the torsion ring and spaced apart therefrom and is configured to receive the handle. In order to extend the handle through both the torsion ring and collar, however, the handle rotates the torsion ring against the spring bias in the ring assembly to create a wedge-like affect by the torsion ring biasing a twist force back against the handle, thereby pressing the handle against the collar. The support is illustratively a panel spaced apart but generally axial with the collar that provides a surface the end of the tool handle can rest upon.

Another illustrative embodiment of the present disclosure provides a vehicle configured to hold a tool. The vehicle comprises a toolholder assembly which includes a torsion ring assembly, a collar and a support. The collar forms an opening configured to receive the tool. The torsion ring assembly is configured to biasly rotate with respect to the collar and has an opening that is positionable non-axial with the opening of the collar. The torsion ring assembly, collar and support are all positioned spaced apart from each other on the vehicle.

In the above and other illustrative embodiments, the vehicle may further comprise: a panel that is configured to carry the tool; the ring, collar and support being configured to hold the tool in a generally vertical orientation with respect to the vehicle.

Another illustrative embodiment of the present disclosure provides a vehicle toolholder assembly comprising a torsion ring assembly, a collar, and a support. The collar forms an opening. The torsion ring assembly is configured to biasly rotate and has an opening. The torsion ring assembly, collar and support are all configured to be positioned spaced apart from each other.

Another illustrative embodiment of the present disclosure provides a vehicle configured to hold a tool. The vehicle comprises a toolholder assembly which includes a ring and a collar. The ring and collar are both attached to the vehicle adjacent a passenger compartment portion of the vehicle. The ring and collar are spaced apart from each other on the vehicle.

In the above and other illustrative embodiments, the vehicle may further comprise: a support also attached to the vehicle adjacent a passenger compartment portion of the vehicle, and is spaced apart from both the ring and collar; the ring being part of a torsion ring assembly configured to biasly rotate with respect to the collar and having an opening that is positionable non-axial with the opening of the collar; and the ring, collar and support being configured to hold the tool in a generally vertical orientation with respect to the vehicle.

Another illustrative embodiment of the present disclosure provides a method of selectively holding a tool on a vehicle. The method comprises the steps of: providing a toolholder assembly which includes a torsion ring assembly, a collar and a support each attached to the vehicle and spaced apart from each other; inserting a tool through an opening formed by a ring from the torsion ring assembly; moving the tool to move the ring with respect to the collar; inserting the tool through a second opening formed by the collar; and engaging the tool with the support.

Additional features and advantages of the vehicle toolholder will become apparent to those skilled in the art upon consideration of the following detailed description of the illustrated embodiments exemplifying the best mode of carrying out the vehicle toolholder as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the vehicle toolholder and such exemplification is not to be construed as limiting the scope of the vehicle toolholder in any manner.

DETAILED DESCRIPTION OF THE DRAWINGS

Figure 1:
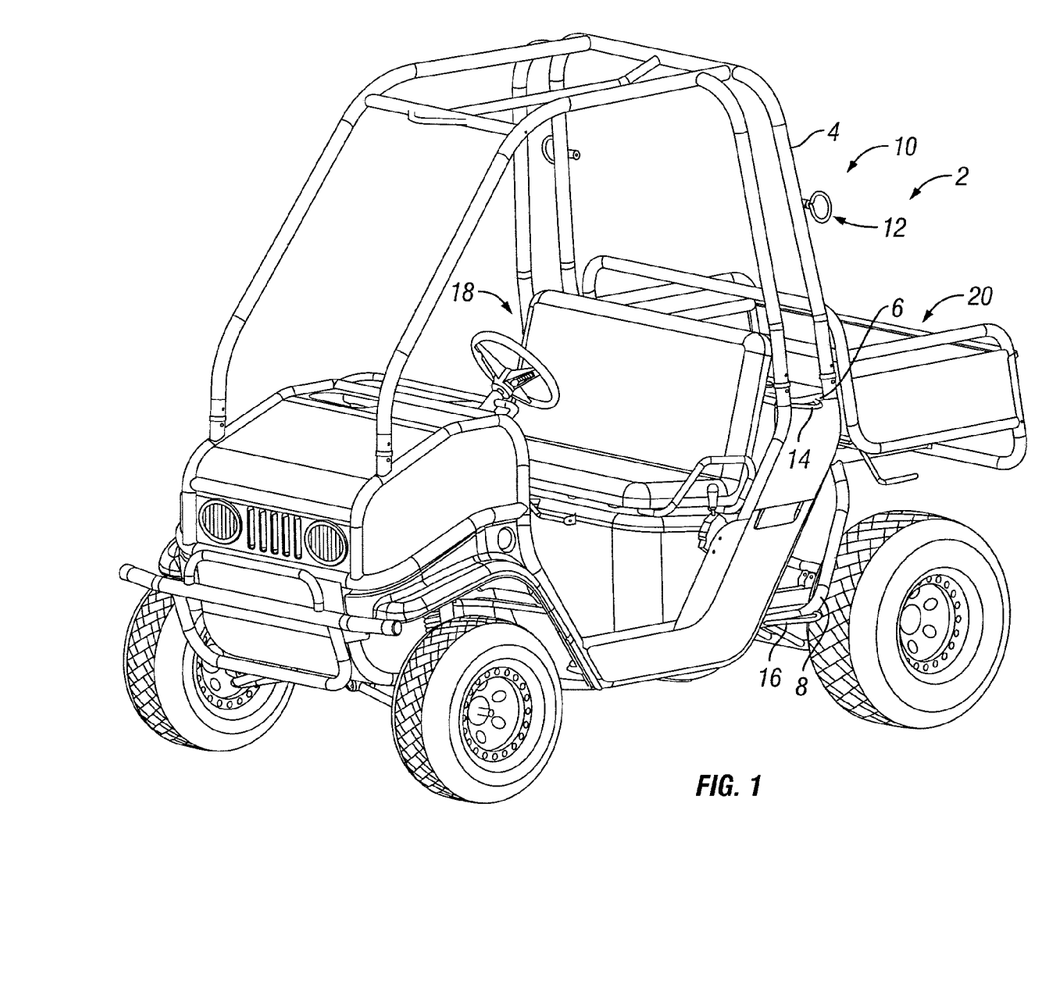
FIG. 1 is a perspective view of a runabout utility vehicle with a toolholder assembly attached thereto.

A perspective view of a runabout utility vehicle 2 is shown in FIG. 1. Vehicle 2 includes an overhead bar portion, spacer bar 6, and frame bar 8. Attached to these bars is toolholder assembly 10 comprising a torsion ring assembly 12, collar or ring 14, and support 16. It can be appreciated from this view that runabout vehicle 2 includes a passenger compartment 18 and utility bed 20. Neither of these locations, however, is optimal for carrying long-handled tools, such as shovels and rakes. Those portions of the vehicle are just not sized for these types of implements. Toolholder assembly 10, however, makes it possible.

Figure 2:
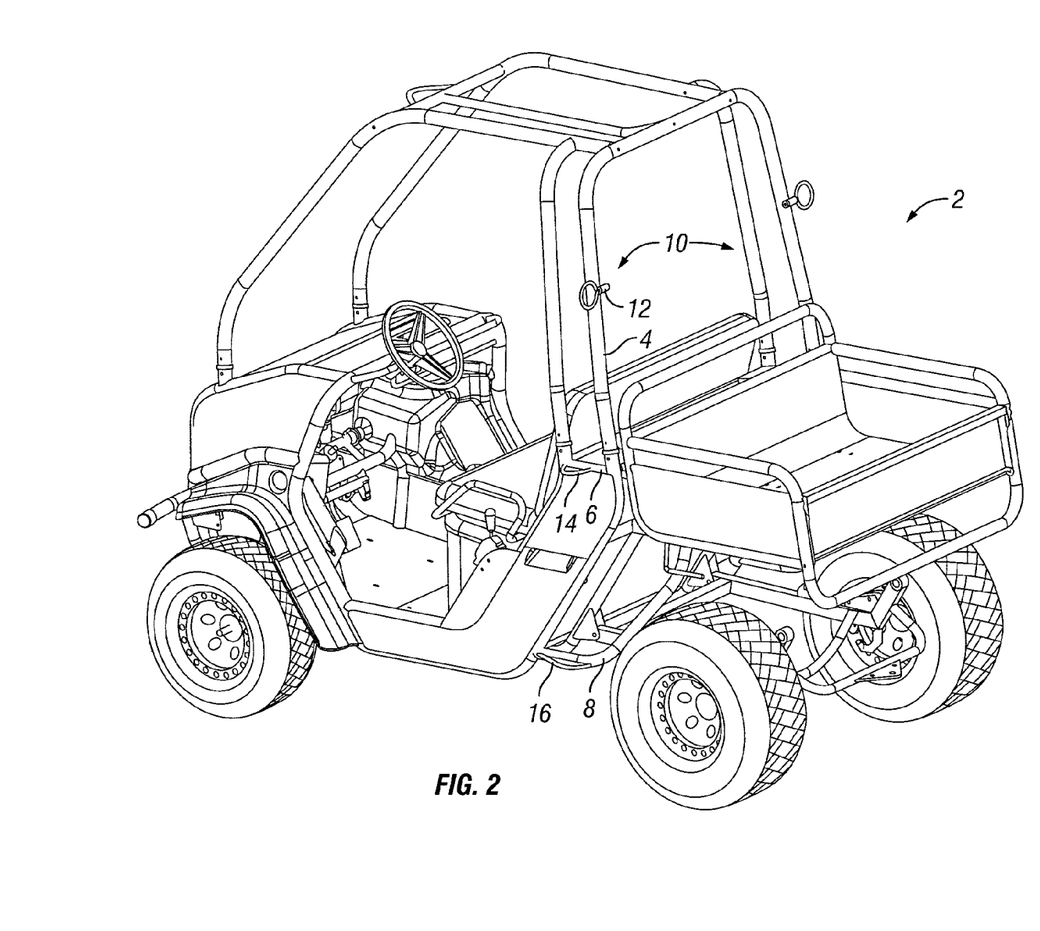
FIG. 2 is a rear perspective view of the vehicle of FIG. 1.

A rear perspective view of vehicle 2 is shown in FIG. 2. This view shows how a toolholder assembly 10 can be installed on each side of vehicle 2. This view also shows the alignment between torsion ring assembly 12, collar 14, and support 16. It is appreciated that assembly 10 can be attached to other structures on the vehicle aside from overhead bar portion 4, spacer bar 6, or frame bar 8. Other structures on a vehicle such as body panels, frames, and the like can be used as long as torsion ring assembly 12, collar 14, and support 16 can be spaced apart from each other and generally aligned as shown to accommodate the long-handled implement. (See, e.g., FIG. 3). This view further demonstrates how toolholder assemblies 10 can be located on each side of vehicle 2. Indeed, toolholder assembly 10 can be located anywhere on a vehicle that has the requisite attachment points to accommodate the relative positioning of torsion ring assembly 12, collar 14, and support 16 as shown.

Figure 3:
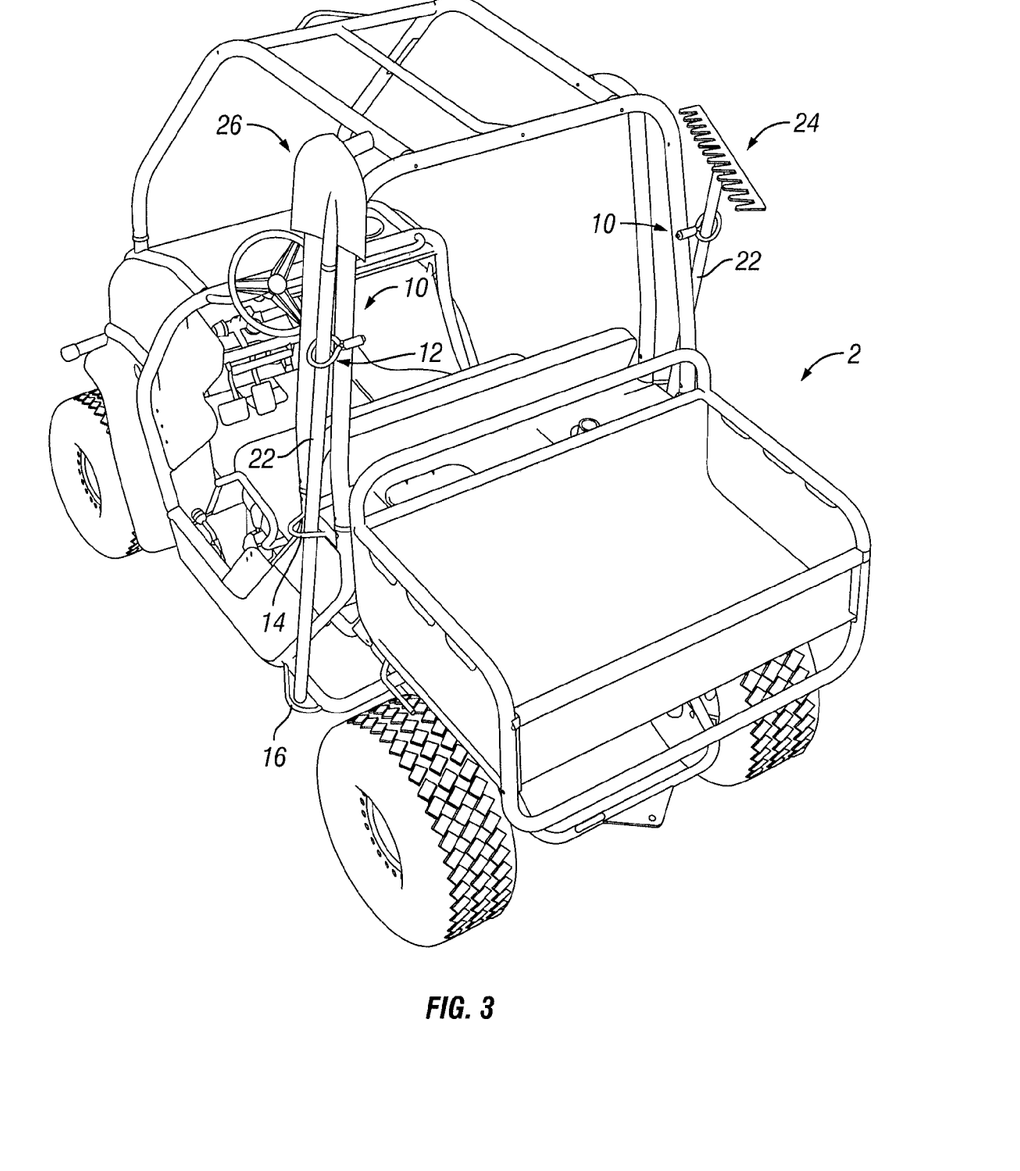
FIG. 3 is another rear perspective view of the vehicle of FIG. 1 showing tools being held by the toolholder assembly.

A rear perspective view of vehicle 2 is shown in FIG. 3. This view shows how toolholder assemblies 10 hold long-handled tools, such as rake 24 and shovel 26, onto vehicle 2. Illustratively, handle 22 extends through torsion ring assembly 12 and collar ring 14 resting on support 16. In this configuration, the tools are securely stowed while remaining out of the way and not occupying space that could be used for other purposes.

Figure 4:
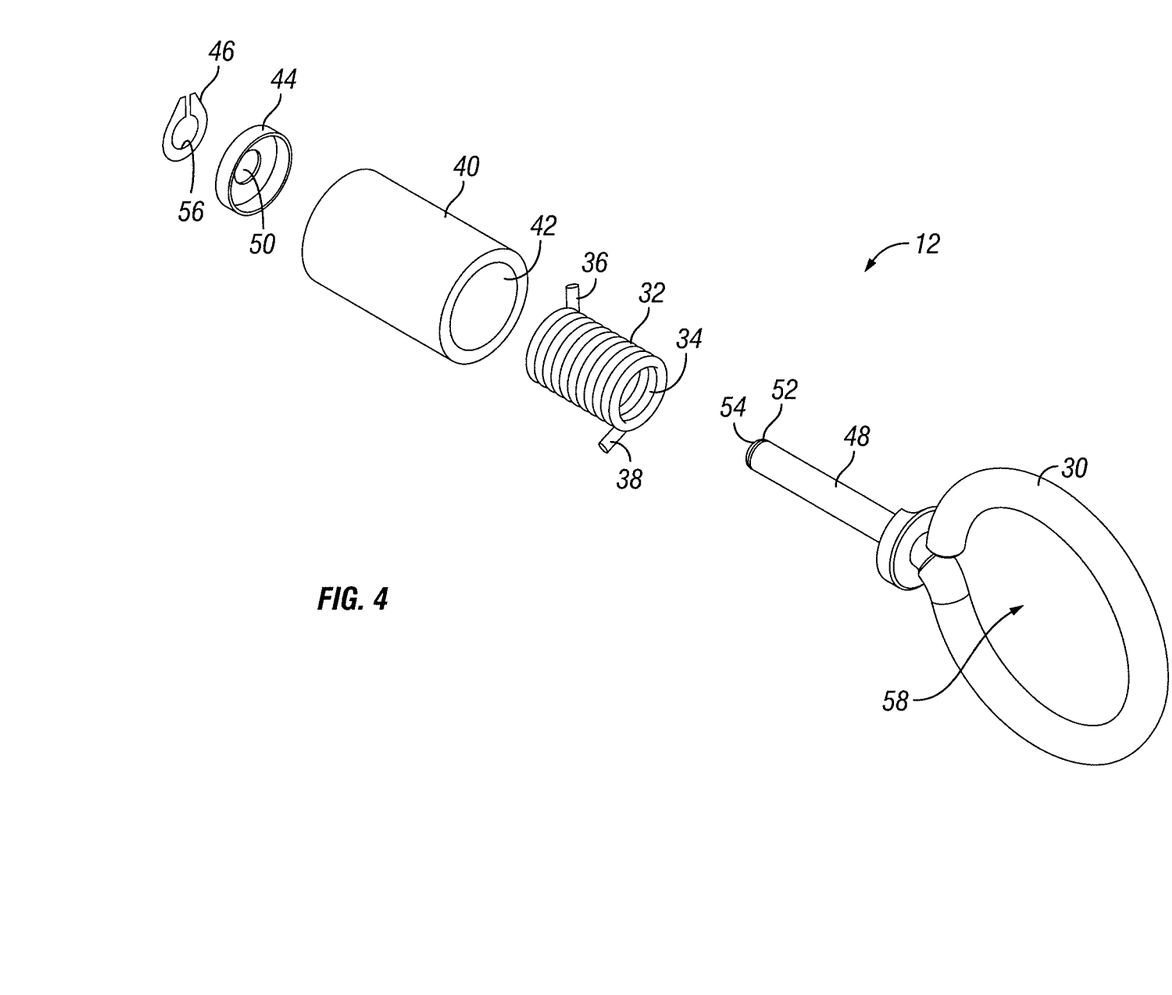
FIG. 4 is a perspective view of a torsion ring assembly.

A perspective view of torsion ring assembly 12 is shown in FIG. 4. This view shows ring 30 disposable through opening 34 of torsion spring 32. In this illustrative embodiment, torsion spring 32 configured to be fitted into bore 42 of collar 40 and receive pin 48. Ends 36 and 38 of spring 32 engage collar 40 and pin 48, respectively, to create the bias on ring 30 as it rotates. Cap 44 encloses the open end of collar 4. Pin 48 of ring 30 extends through opening 34, bore 42, and opening 50 on cap 44. Channel 52 adjacent end 54 of pin 48 engages edge 56 of snap ring 46. This holds the components of assembly 12 together. Opening 58 of ring 30 is configured to receive the tool's handle. The bias of spring 32 is meant to keep opening 58 of ring 30 in a non-axially aligned position with respect to collar ring 14. See for example, the position of torsion ring assembly 12 with respect to collar 14 and support 16 in FIGS. 1 and 2 as compared to the position of assembly 12 in FIG. 3. This is so once the handle is disposed through torsion ring assembly 12 and collar ring 14, bias from spring 32 will act on the handle to help keep it secured in assembly 10.

Figure 5:
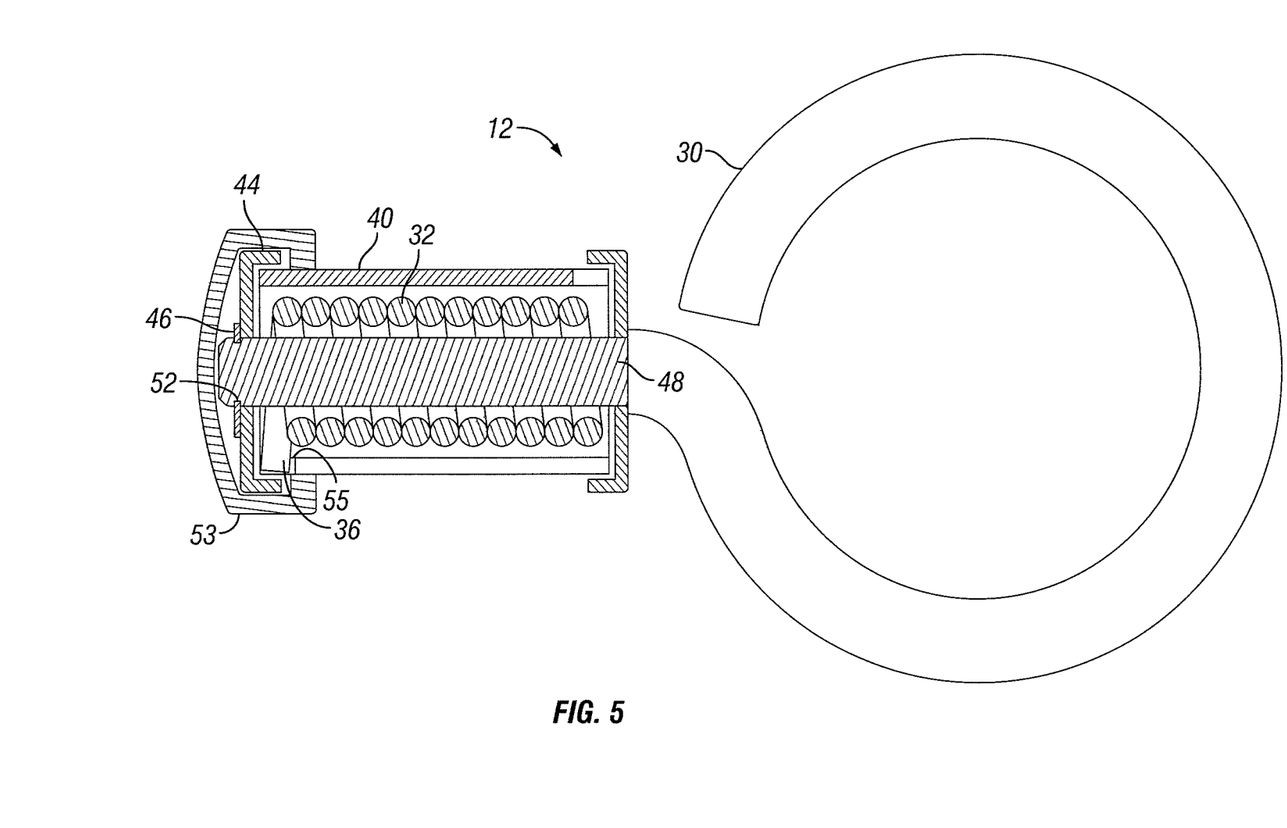
FIG. 5 is a cross-sectional view of the torsion ring assembly of FIG. 4.

A cross-sectional view of torsion ring assembly 12 is shown in FIG. 5. This view shows pin 48 of ring 30 extending through both spring 32 and collar 14. This view also demonstrates how pin 48 rotatably secures to assembly 10 via snap ring 46 engaging slot 52. Also shown is cap 44 located between collar 14 and snap ring 46. Another cap 53 illustratively couples to collar 40 covering the distal end of pin 48. This view also shows how end 36 extends into opening 55 to hold spring 32 in place. The other end 38 of spring 32 engages pin 48 so that as ring 30 rotates, so too does end 38. Because end 36 does not move, tension or bias builds in the spring in the opposite direction ring 30 is being rotated. This has the net effect of applying a force or bias onto handle 22 to help hold it in place once disposed through collar 14.

Figure 6:
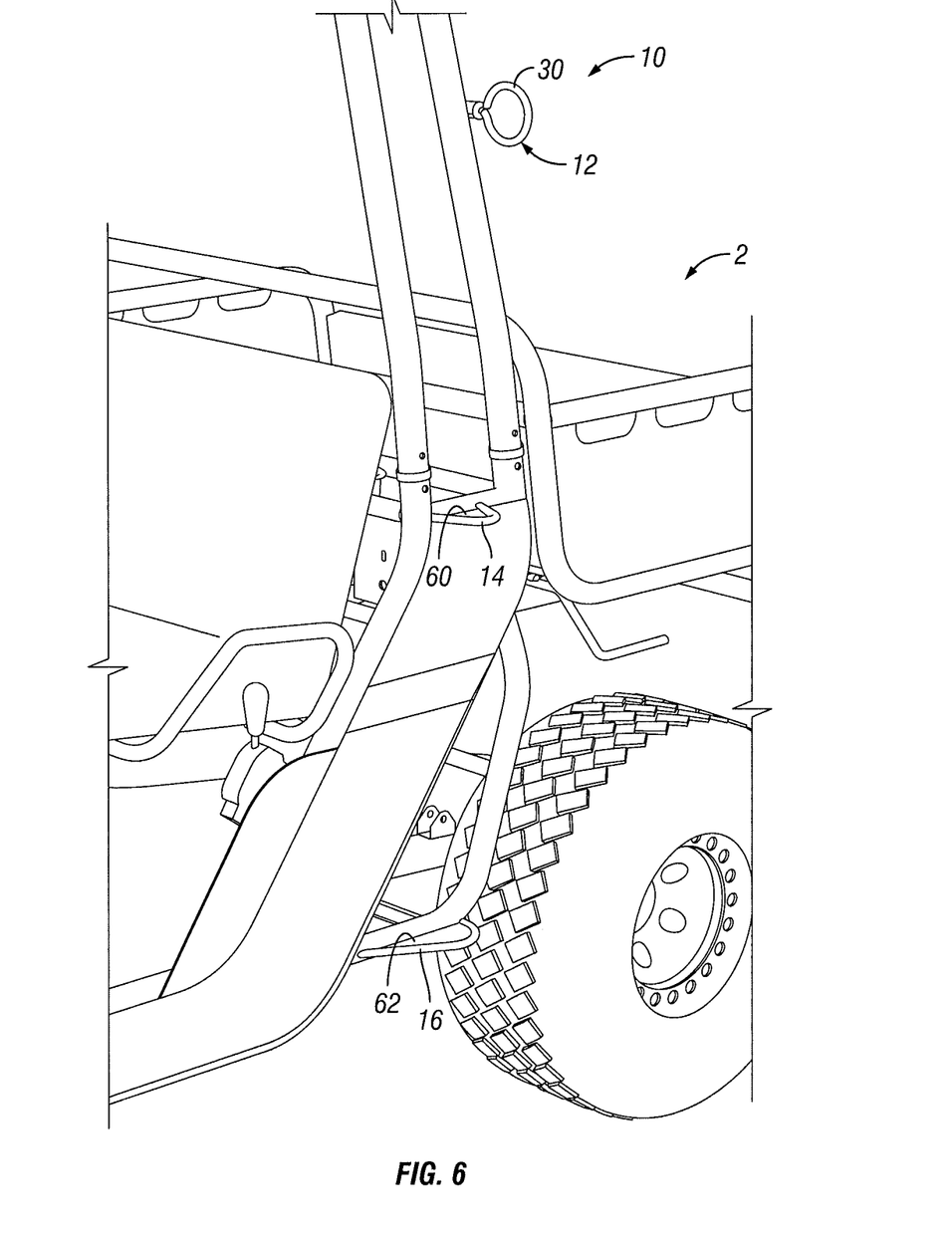
FIG. 6 is a detailed perspective view of the vehicle of FIG. 1 with a toolholder assembly attached thereto.

A detailed perspective view of vehicle 2 with toolholder assembly 10 attached thereto is shown in FIG. 6. Assembly 12 is positioned about perpendicular to opening 60 of collar ring 14 and planer surface 62 of support 16.

Figure 7:
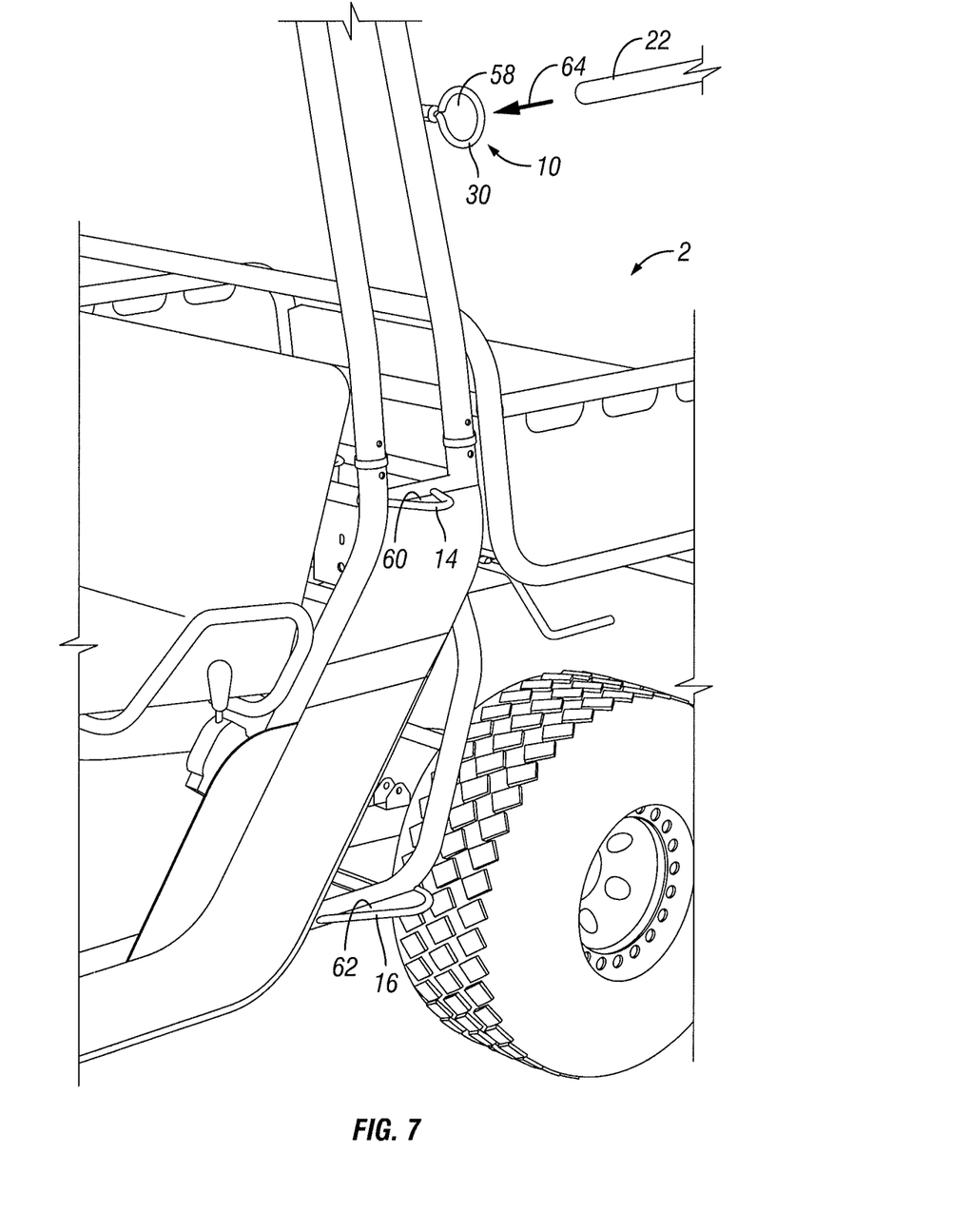
FIG. 7 is a perspective view of the vehicle of FIG. 1 demonstrating how a tool handle becomes selectively secured to the toolholder assembly.
Figure 8:
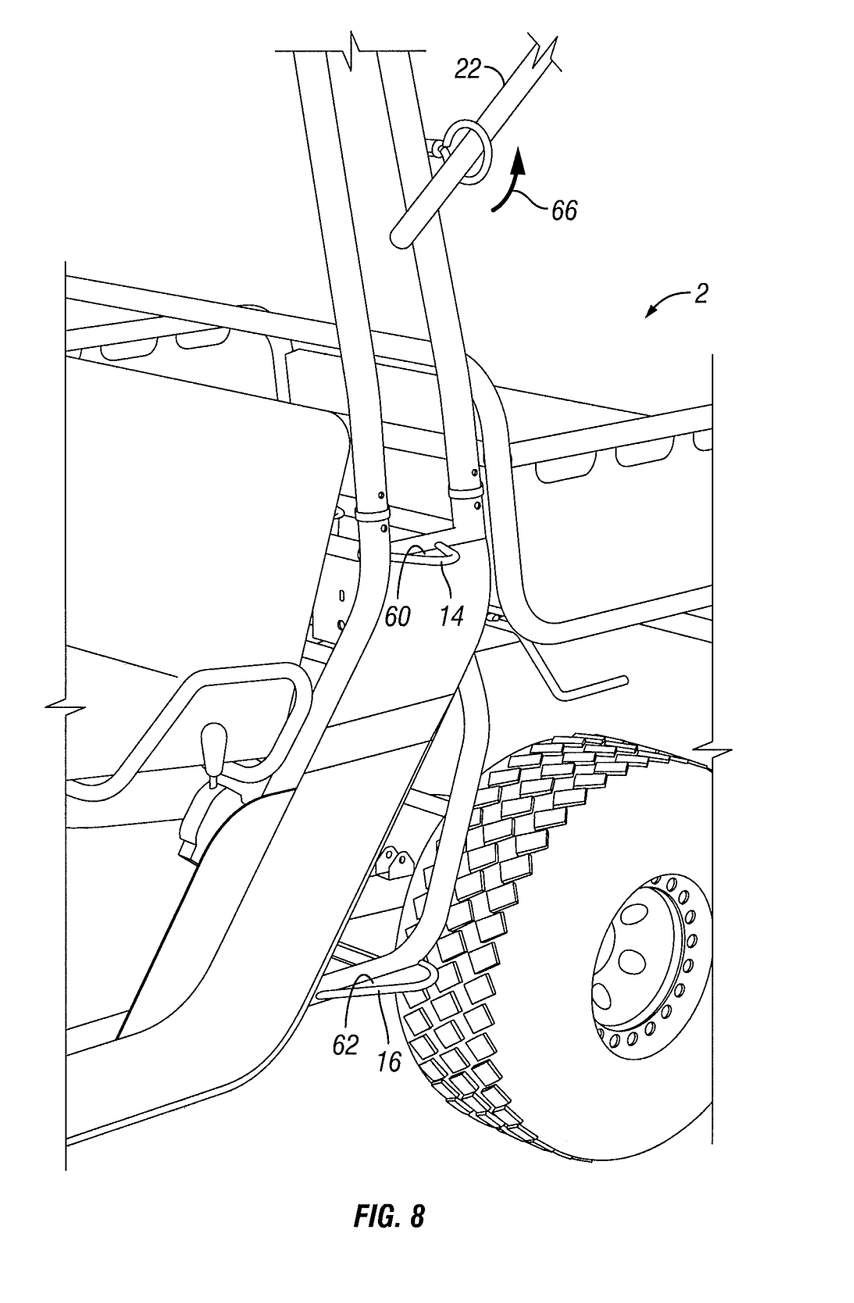
FIG. 8 is another perspective view of the vehicle of FIG. 1 further demonstrating the progression of how the tool handle of FIG. 7 becomes selectively secured to the toolholder assembly.
Figure 9:
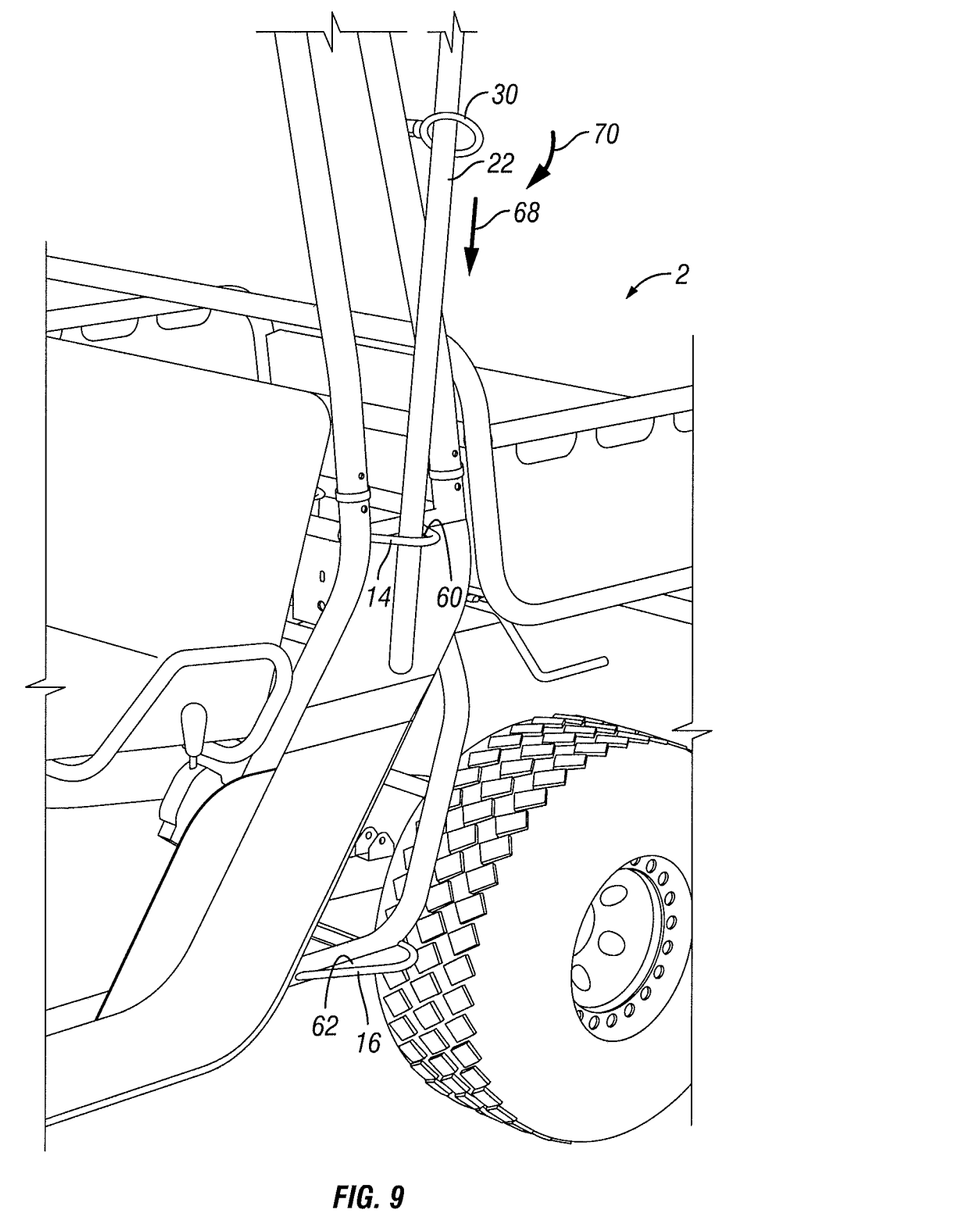
FIG. 9 is yet another perspective view of the vehicle of FIG. 1 still further demonstrating the how the tool handle of FIG. 7 becomes selectively secured to the toolholder assembly.
Figure 10:
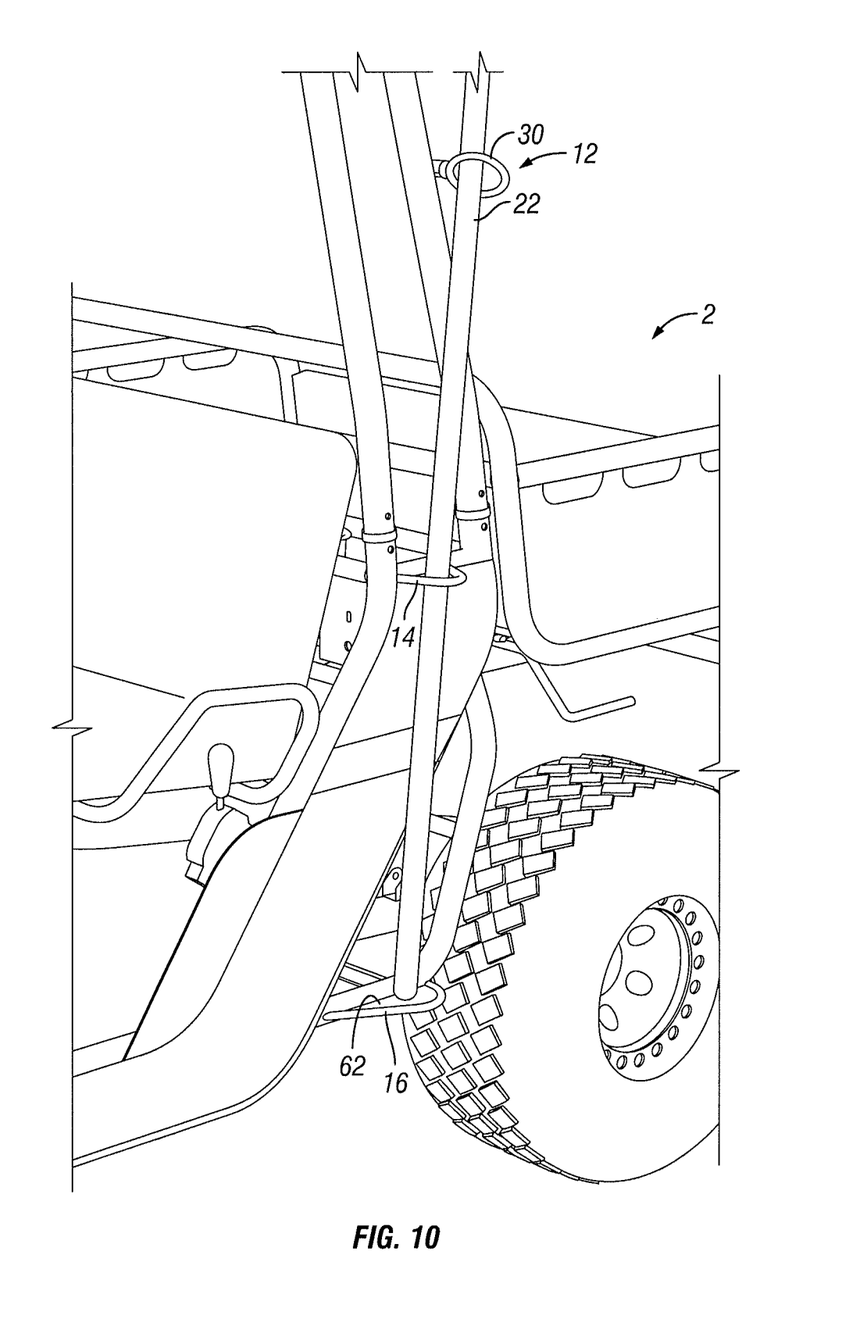
FIG. 10 is a perspective view of the vehicle of FIG. 1 demonstrating how the tool handle of FIG. 7 is selectively secured to the toolholder assembly.

Perspective views of vehicle 2 are shown in FIG. 7 through 10 are progressive views demonstrating how a tool handle 22 becomes selectively secured to toolholder assembly 10. As shown in FIG. 7, the first step is to extend handle 22 through opening 58 of ring 30 in direction 60. After handle 22 extends through opening 58, it is rotated in direction 66 as shown in FIG. 8. In this illustrative embodiment, the rotation begins prior to handle 22 extending through opening 60 of collar 14. Twisting ring 30 against the bias of a spring 32 (see also FIG. 4) creates a force on handle 22. Nevertheless, once handle 22 rotates in direction 66 enough that handle 22 can extend through opening 60 of collar 14, handle 22 moves in direction 68 as shown in FIG. 9. This bias force indicated by arrow 70 is in a direction opposite the direction 66 handle 22 was moved. This force acting on handle 22 biases handle 22 against collar 14. This helps keep handle 22 secure while vehicle 2 is moving. Ring 30, therefore, creates a wedge effect on handle 22 in conjunction with ring 14. Continuing to extend handle 22 in direction 68, pushes it down until it rests on surface 62 of support 16. Support 16 prevents or limits the extent of movement of handle 22 in direction 68. The long-handled tool is now in its stowed position on vehicle 2, secured in place by the support 16, collar 14, and torsion ring assembly 12. The tool can, therefore, maintain its stowed position while vehicle 2 is traveling and does not occupy either seating or bed room on the vehicle.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the disclosure.

What is claimed is:
1. A vehicle toolholder assembly comprising:
 a torsion ring assembly;
 a collar; and
 a support;
 wherein the collar forms an opening;
 wherein the torsion ring assembly is configured to biasly rotate and has an opening;
 wherein the torsion ring assembly, collar, and support are all configured to be positioned spaced apart from each other;
 wherein the collar is configured to directly attach to an exterior surface of a passenger compartment adjacent to and rearward of an occupant opening on a vehicle and wherein the collar is configured to attach about midway up the exterior surface of the passenger compartment rearward of the occupant opening;
 wherein the torsion ring assembly is configured to directly attach to a roll-bar portion of the exterior of the passenger compartment, located adjacent the occupant opening, and spaced apart from the collar;

wherein the torsion ring is positioned so a tool entering the ring turns the ring so the opening of the torsion ring aligns with the opening in the collar and the base to secure the tool onto the toolholder;

wherein the torsion ring assembly is configured to attach to the roll-bar portion on a plane located rearward of the occupant opening; and wherein the support is configured to directly attach to a third location on the exterior surface of the passenger compartment, and spaced apart from both the collar and the torsion ring, and the support is configured to locate forward of a rear ground-engaging wheel and rearward of the occupant opening.

2. A vehicle configured to hold a tool, the vehicle comprising:

a passenger compartment of the vehicle having an occupant opening configured to allow an occupant to enter and exit the passenger compartment;

a toolholder assembly which includes a ring and a collar;

wherein the ring and collar are both attached to the vehicle adjacent a passenger compartment portion of the vehicle;

wherein the collar is directly attached to an exterior surface of the passenger compartment adjacent to and rearward of the occupant opening and wherein the collar is attached about midway up the exterior surface of the passenger compartment forward of a utility bed and rearward of the occupant opening;

wherein the torsion ring assembly is directly attached to another portion of the exterior surface of the passenger compartment, located adjacent the occupant opening, and spaced apart from the collar;

wherein the torsion ring assembly is attached to the exterior surface on a plane located rearward of the occupant opening;

wherein the torsion ring is positioned so a tool entering the ring turns the ring so the opening of the torsion ring aligns with the opening in the collar and the base to secure the tool onto the toolholder; and wherein the ring and collar are spaced apart from each other on the vehicle.

3. The vehicle of claim 2, further comprising a support also attached to the vehicle adjacent the passenger compartment of the vehicle, and is spaced apart from both the ring and collar.

4. The vehicle of claim 2, wherein the ring is part of a torsion ring assembly that is configured to biasly rotate with respect to the collar and has an opening that is positionable non-axial with the opening of the collar.

5. The vehicle of claim 3, wherein the ring, collar, and support are configured to hold the tool in a generally vertical orientation with respect to the vehicle.

6. A vehicle configured to hold a tool, the vehicle comprising:

a passenger compartment of the vehicle having an occupant opening configured to allow an occupant to enter and exit the passenger compartment;

a toolholder assembly located exterior of the vehicle which includes a torsion ring assembly, a collar, and a support;

wherein the toolholder assembly is positioned to hold the tool in a substantially vertical orientation;

wherein the collar forms an opening configured to receive the tool;

wherein the collar is directly attached to an exterior side surface of the passenger compartment adjacent to and rearward of the occupant opening and wherein the collar is attached about midway up the exterior side surface of the passenger compartment rearward of the occupant opening;

wherein the torsion ring assembly is configured to biasly rotate with respect to the collar and has an opening that is positionable non-axial with the opening of the collar;

wherein the torsion ring assembly is directly attached to another portion of the exterior side surface of the passenger compartment, located adjacent the occupant opening, and spaced apart from the collar;

wherein the torsion ring assembly is attached to the exterior side surface on a plane located rearward of the occupant opening;

wherein the support is directly attached to a third location on the exterior side surface of the passenger compartment, and spaced apart from both the collar and torsion ring;

wherein the support is located forward of a rear ground-engaging wheel and rearward of the occupant opening;

wherein the torsion ring assembly, collar, and support are all positioned spaced apart from each other on the vehicle; and wherein the torsion ring is positioned so a tool entering the ring turns the ring so the opening of the torsion ring aligns with the opening in the collar and the base to secure the tool onto the toolholder.

7. The vehicle of claim 6, wherein the support further comprises a panel that is configured to carry the tool.

8. A method of selectively holding a tool on a vehicle, the method comprising the steps of:

providing a toolholder assembly which includes a torsion ring assembly, a collar, and a support each attached to the vehicle and spaced apart from each other;

inserting a tool through an opening formed by a ring from the torsion ring assembly;

moving the tool to move the ring with respect to the collar;

inserting the tool through a second opening formed by the collar; and engaging the tool with the support;

wherein the collar is directly attached to an exterior surface of a passenger compartment adjacent to and rearward of an occupant opening wherein the collar is attached about midway up an exterior surface of the passenger compartment of the vehicle rearward of the occupant opening of the vehicle;

wherein the torsion ring assembly is directly attached to another portion of the exterior surface of the passenger compartment, located adjacent the occupant opening, and spaced apart from the collar;

the torsion ring assembly is attached to the exterior surface on a plane located rearward of the occupant opening;

wherein the support is directly attached to a third location on the exterior surface of the passenger compartment, and spaced apart from both the collar and torsion ring; and wherein the torsion ring is positioned so a tool entering the ring turns the ring so the opening of the torsion ring aligns with the opening in the collar and the base to secure the tool onto the toolholder.

* * * * *